United States Patent
Sifry

(10) Patent No.: US 7,596,571 B2
(45) Date of Patent: Sep. 29, 2009

(54) ECOSYSTEM METHOD OF AGGREGATION AND SEARCH AND RELATED TECHNIQUES

(75) Inventor: David L. Sifry, San Francisco, CA (US)

(73) Assignee: Technorati, Inc., San Francisco, CA (US)

( * ) Notice: Subject to any disclaimer, the term of this patent is extended or adjusted under 35 U.S.C. 154(b) by 127 days.

(21) Appl. No.: 11/157,491

(22) Filed: Jun. 20, 2005

(65) Prior Publication Data

US 2006/0004691 A1   Jan. 5, 2006

Related U.S. Application Data

(60) Provisional application No. 60/584,613, filed on Jun. 30, 2004.

(51) Int. Cl.
*G06F 7/00* (2006.01)
(52) U.S. Cl. .............................. 707/100; 707/1; 707/3; 707/10
(58) Field of Classification Search .................. None
See application file for complete search history.

(56) References Cited

U.S. PATENT DOCUMENTS

| | | | | |
|---|---|---|---|---|
| 5,848,396 | A | * | 12/1998 | Gerace .................. 705/10 |
| 5,893,091 | A | * | 4/1999 | Hunt et al. ................ 707/3 |
| 6,169,794 | B1 | * | 1/2001 | Oshimi et al. ........... 379/221.09 |
| 6,466,970 | B1 | * | 10/2002 | Lee et al. ................ 709/217 |
| 6,564,251 | B2 | | 5/2003 | Katariya et al. |
| 6,606,644 | B1 | | 8/2003 | Ford et al. |
| 6,643,661 | B2 | * | 11/2003 | Polizzi et al. ............ 707/100 |
| 2001/0003828 | A1 | * | 6/2001 | Peterson et al. .......... 709/219 |
| 2002/0042738 | A1 | | 4/2002 | Srinivasan et al. |
| 2002/0049788 | A1 | * | 4/2002 | Lipkin et al. ............. 707/513 |

(Continued)

FOREIGN PATENT DOCUMENTS

WO  WO002/13035  2/2002

OTHER PUBLICATIONS

People of earth, the cluetrain manifesto, http://www.cluetrain.com, Mar. 24, 1999.

(Continued)

*Primary Examiner*—Tim T. Vo
*Assistant Examiner*—Hasanul Mobin
(74) *Attorney, Agent, or Firm*—Weaver Austin Villeneuve & Sampson LLP

(57) ABSTRACT

Techniques are described for effecting data aggregation in a network. Event notifications are received from a plurality of content sites on the network. Each event notification indicates occurrence of an event associated with a corresponding one of the content sites. Each event corresponds to a change to content associated with the corresponding content site. In response to each event notification, event metadata are generated. The event metadata include a time stamp for the event and change data corresponding to the change to the content. The event metadata are indexed in a plurality of databases with reference to a plurality of index metrics including the time stamp. The indexing of the event metadata for each event occurs within days, hours, or even minutes of receipt of the corresponding event notification thereby enabling retrieving of the changes to the content from the plurality of databases using any of the index metrics in near real time.

25 Claims, 3 Drawing Sheets

U.S. PATENT DOCUMENTS

| | | |
|---|---|---|
| 2002/0069244 A1* | 6/2002 | Blair et al. .................. 709/203 |
| 2003/0033606 A1* | 2/2003 | Puente et al. ............... 725/110 |
| 2003/0036944 A1 | 2/2003 | Lesandrini et al. |
| 2006/0212350 A1 | 9/2006 | Ellis et al. |

OTHER PUBLICATIONS

International Search Report dated Aug. 29, 2007, received in corresponding PCT Application No. PCT/US05/22777 (3 pgs).

Written Opinion of the International Searching Authority dated Aug. 29, 2007, received in corresponding PCT Application No. PCT/US05/22777 (8 pgs).

U.S. Appl. No. 11/973,292, filed Oct. 5, 2007, Hirshberg.

U.S. Appl. No. 11/774,497, filed Jul. 6, 2007, Sifry.

PCT International Search Report & Written Opinion for PCT/US07/80591 dated Apr. 28, 2008 (TECHP007WO).

Search Report dated Oct. 7, 2008 for European Patent Application No. 05763596.3. (TECHP001EP).

Technorati: Web Services for Bloggers, "Cosmos Watchlists Members Help Inbound Linkstop 100 Recent Blogs . . . " dated Dec. 27, 2003, Technorati.com, Beta.Technorati.com, XP002497134, Retrieved from Internet at http://Web.archive.org/web/20031227025435; http://beta.technorati.com/ on Sep. 23, 2008, pp. 1-5.

Technorati.com: "FAQ" dated Dec. 27, 2003, Technorati.com, Beta.Technorati.com/Help/FAQ.html—XP002497135, Retrieved from the Internet at URL: http://web.archive.org/web/20040607043448.beta.technorati.com/help/faq.html on Sep. 23, 2008, pp. 1-4.

FeedHenry (2007) "Information Syndication Aggregation, Personalization and Delivery," No. XP007901890, Retrieved from the Internet at http://www.feedhenry.com/downloads/overviewpresentation.pdf/ on Mar. 21, 2007, pp. 1-15.

Abdelunur et al. (2007) "Beyond Blogging: Feed Syndication and Publishing with Java Technology," #XP002438032, Retrieved from the Internet at http://developers.sun.com/learning/javaoneonline/2005/webtier/ on Jun. 18, 2007, pp. 1-20.

Joyce, John (2004), "RSS and Syndication Feeds are popular for their ability to distribute meta-data about a site, as well as for privacy," Scientific Computing & Instrumentation, Reed Business Information, Rockaway, NJ, vol. 21, No. 6, May 1, 2004 [#XP008058207] 2 pages.

Oreilly, Meerkat: An Open Wire Service (2001), dated Aug. 14, 2001 as oreillynet.com/meerkat, Retrieved from the Internet at http://web.archive.org/web/20010814114843/www.oreillynet.com/meerkat/ on Sep. 24, 2008, #XP002497136, 3 pages.

Bond, Julian (2001) "Content Syndication: The Syndic8 Project," Content Wire.com, dated Oct. 23, 2001; Retrieved from the Internet at Content Wire—Syndication News, http://web.archive.org/web/2004602225737/www.content-ire.com/_online/syndication.CFM?CCS=111&CS=916, #XP002497137 on Sep. 24, 2008, 2 pages.

* cited by examiner

ECOSYSTEM METHOD OF AGGREGATION AND SEARCH AND RELATED TECHNIQUES

RELATED APPLICATION DATA

The present application claims priority under 35 U.S.C. 119(e) to U.S. Provisional Application No. 60/584,613 for ECOSYSTEM METHOD OF AGGREGATION AND SEARCH AND RELATED TECHNIQUES filed Jun. 30, 2004, the entire disclosure of which is incorporated herein by reference for all purposes.

BACKGROUND OF THE INVENTION

The present invention relates to the monitoring of dynamic content in networks, e.g., the Internet, and, more specifically, to techniques which facilitate the monitoring and indexing of such content in near real time.

A vast array of software solutions facilitates the publishing of user-generated content on the Web and the Internet. Some solutions are hosted. Others operate from the user's machine or server. Some are highly configurable, providing source code which the user may customize. Current and past examples of such solutions within the context of so-called "Web logs" include Radio UserLand, Movable Type, Word Press, Live Journal, B2, Grey Matter, Blossom, Blogger, Blogspot, Type Pad, Xanga, Diaryland, Nifty, etc. In general, most of these tools and solutions may be thought of as relatively simple content management systems which facilitate "personal publishing." The availability of these tools has resulted in the proliferation of Web logs, or "blogs," which are typically generated by individuals on the Web.

A typical blog might include a series of postings by the "blogger," or author of the content in the postings, relating to one or more topics. A posting might also include, for example, a link to an article relating to a current event being discussed, a link to another blog upon which the blogger is commenting or to which the blogger is responding, or a link to an authority on the subject of the posting. Blogs may also contain links outside of the regular postings which point to sites or documents in which the blogger has an interest, or to other blogs (i.e., blog roll). Blogs often include a calendar with links to an archive of historical postings on the blog. Obviously, these are merely exemplary characteristics of a blog, and are useful in pointing out the fact that blogs have a relatively structured way in which information is presented. In addition, blogs are only one example of mechanisms by which content may be dynamically published in electronic networks. The point is that there is a huge amount of content being dynamically generated and published on the Web and the Internet which includes links to other content and information, and which may be thought of as ongoing "conversations."

And, as has been posited on the Internet, one can think of these ongoing and interconnected conversations as markets (e.g., see The Cluetrain Manifesto). This is to be contrasted with the traditional market model which defines markets primarily with respect to transactions. Relying primarily on information relating to transactions to monitor or evaluate a market arguably misses the most relevant information relating to the market being monitored or evaluated. Such a conventional approach can be likened to focusing on patterns of punctuation in a document rather than the substance of the document. And if one begins to focus on the substance of the conversations relating to a particular market rather than mere transaction data, the exercise then becomes tracking these conversations in meaningful and timely ways.

Unfortunately, most of the tools currently available on the Web and on the Internet are inadequate for such a task. For example, because of the way in which they operate, most search engines on the Internet are weeks or months behind in identifying and cataloguing the constantly changing content on the Web. That is, the typical search engine periodically "crawls" the Web to construct an enormous database which is, essentially, a copy of the Web. Given the size of the Web, these crawls may require on the order of weeks to complete. And there are many who assert that such crawling technologies are only actually looking at less than 10% of the content available on the Web. In any case, once the documents are identified, a reverse index is created using a key word vocabulary, and then the documents are then scored relative to those key words. All of this information is then pushed to query servers which respond to key word searches.

Given the time required to perform all of these tasks, it becomes apparent that traditional search engines are not particularly effective for identifying anything on the Web which is less than a couple of weeks old. In addition, because search engines are typically agnostic with regard to the time at which documents were created or modified, they are not particularly useful for finding content created within particular time ranges or with reference to any time-related metric.

In view of the foregoing, there is a need to provide mechanisms by which dynamic content on the Web and on the Internet may be indexed, monitored, and evaluated substantially in real time.

SUMMARY OF THE INVENTION

According to the present invention, techniques are provided for effecting data aggregation in a network. Event notifications are received from a plurality of content sites on the network. Each event notification indicates occurrence of an event associated with a corresponding one of the content sites. Each event corresponds to a change to content associated with the corresponding content site. In response to each event notification, event metadata are generated. The event metadata include a time stamp for the event and change data corresponding to the change to the content. The event metadata are indexed in a plurality of databases with reference to a plurality of index metrics including the time stamp. The indexing of the event metadata for each event occurs within seven days of receipt of the corresponding event notification thereby enabling retrieving of the changes to the content from the plurality of databases using any of the index metrics in near real time. According to various embodiments, the indexing of the event metadata occurs within a day, hours, or even minutes of receipt of the event notification.

A further understanding of the nature and advantages of the present invention may be realized by reference to the remaining portions of the specification and the drawings.

DETAILED DESCRIPTION OF SPECIFIC EMBODIMENTS

Figure 1:
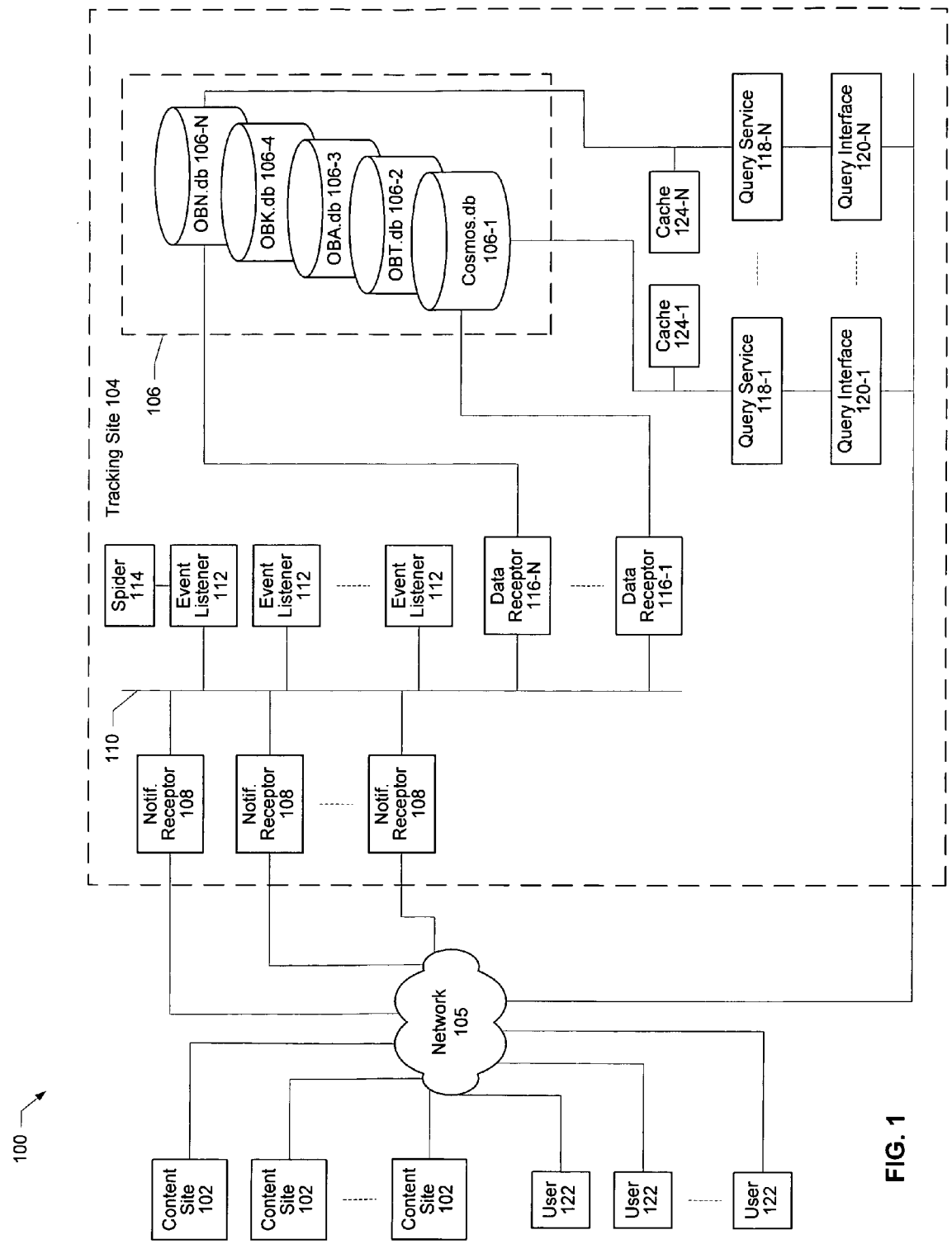
FIG. 1 is a simplified network diagram of an exemplary system for data aggregation and search according to a specific embodiment of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to the invention, an event-driven method of data aggregation and indexing is provided. According to various embodiments of the invention, the present invention allows dynamic information to be tracked, indexed, and searched in a timely manner, i.e., in near real time. According to some embodiments, such techniques take advantage of the semi-structured nature of content published on the Web to track relevant information about the content within minutes rather than weeks.

Specific implementations of the present invention employ a "service-oriented architecture" (SOA) in which the functional blocks referred to are assumed to be different types of services (i.e., software objects with well defined interfaces) interacting with other services in the ecosystem. A service-oriented architecture (SOA) is an application architecture in which all functions, or services, are defined using a description language and have invokable interfaces that are called to perform processes. Each interaction is independent of every other interaction and the interconnect protocols of the communicating devices (i.e., the infrastructure components that determine the communication system) are independent of the interfaces. Because interfaces are platform-independent, a client from any device using any operating system in any language can use the service.

It will be understood, however, that the functions and processes described herein may be implemented in a variety of other ways. It will also be understood that each of the various functional blocks described may correspond to one or more computing platforms in a network. That is, the services and processes described herein may reside on individual machines or be distributed across or among multiple machines in a network or even across networks. It should therefore be understood that the present invention may be implemented using any of a wide variety of hardware, network configurations, operating systems, computing platforms, programming languages, service oriented architectures (SOAs), communication protocols, etc., without departing from the scope of the invention.

In some of the examples below, the content publishing and management tools discussed are often referred to as tools for the creation and management of blogs. Therefore, specific embodiments of the invention are described for tracking blogs. However, it should be understood that the techniques of the present invention may relate to any tools by which content may be generated and published in electronic networks, and should therefore not be limited by references to blogs. Examples of other such tools include, but are not limited to, wiki web page editing tools, social network profile editing tools, or any other general purpose or specialized content management system (CMS) or personal publishing tools. More generally, any state change in information on a network which can be characterized and flagged as an event as described herein may trigger the data aggregation and indexing techniques of the present invention.

Referring now to FIG. 1, an ecosystem 100 designed according to the invention will be described. A variety of content sites 102 exist on the Web on which content is generated and published using a variety of content publishing tools and mechanisms, e.g., the blogging tools discussed above. Such publishing mechanisms may reside on the same servers or platforms on which the content resides or may be hosted services.

A tracking site 104 is provided which receives events notifications, e.g., pings, via a wide area network 105, e.g., the Internet, each time content is posted or modified at any of sites 102. So, for example, if the content is a blog which is modified using Type Pad, when the content creator publishes the changes, code associated with the publishing tool makes a connection with tracking site 104 and sends, for example, an XML remote procedure call (XML-RPC) which identifies the name and URL of the blog. Similarly, if a news site post a new article, an event notification (e.g., an XML-RPC) would be generated. Tracking site 104 then sends a "crawler" to that URL to parse the information found there for the purpose of indexing the information and/or updating information relating to the blog in database(s) 106. According to embodiments relating specifically to blogs, the parsing of the information in a blog is facilitated by the fact that most blogs are similarly configured or have a semi-structured format which either follows a general archetype or a template provided by the well known blogging tools. According to some embodiments, the spidering and parsing of a blog may also be facilitated by the use of, among other things, explicit and implicit alternate representations of the blog (e.g., feeds), external metadata (e.g., robots, sitemaps, and contact information files), and blog archives.

According to some implementations, tracking site 104 may periodically receive aggregated change information. For example, tracking site 104 may acquire change information from other "ping" services. That is, other services, e.g., Blogger, exist which accumulate information regarding the changes on sites which ping them directly. These changes are aggregated and made available on the site, e.g., as a changes.xml file. Such a file will typically have similar information as the pings described above, but may also include the time at which the identified content was modified, how often the content is updated, its URLs, and similar metadata. Tracking site 104 retrieves this information periodically, e.g., every 5 or 10 minutes, and, if it hasn't previously retrieved the file, sends a crawler to the indicated site, and indexes and scores the relevant information found there as described herein.

In addition, tracking site 104 (or closely associated devices or services) may itself accumulate similar change files for periodic incorporation into the database rather than each time a ping is received. In any case, it should be understood that embodiments of the invention are contemplated in which change information is acquired using any combination of a variety of techniques.

As will be understood, event notification mechanisms, e.g., pings, may be implemented in a wide variety of ways and may be generally characterized as mechanisms for notifying the system of state changes in dynamic content. Such mechanisms might correspond to code integrated or associated with a publishing tool (e.g., blog tool), a background application on PC or web server, etc.

According to various specific embodiments, the mechanisms which generate the pings to tracking site 104 are integrated in some way with the publishing tool(s) being used by the authors of the content being published. When an author elects to publish or post content (e.g., by selecting a "Post and Publish" object on his screen), code associated with the publishing tool establishes an HTTP connection with site 104 at a specific URL, and an HTTP "get" or "post" is transmitted in the form of an XML remote procedure call (RPC). This code may be provided by tracking site 104, and may simply be associated with or comprise an integral part of the publishing tool.

According to a specific embodiment of the invention, three different ping types are employed, referred to herein as a standard blog ping, an extended blog ping, and a non-blog ping. A standard ping has two arguments, the name of the post site or Web log and the URL. An extended ping also identifies any associated RSS feed. Standard pings are generally sufficient for most blog sites given relative uniformity and semi-structured nature of the information on blog sites. The non-blog ping is intended for more traditional publishers and includes the main site URL as well as the new URL of the recently published document. This ping may identify any number of categories as self-selected by the publisher, as well as arbitrary metadata such as, for example, the author. This information is useful in that the crawler that is sent to such a site will be crawling an arbitrary HTML document as opposed to the semi-structured information in a blog. Obviously, other types of pings and event notification mechanisms may be employed without departing from the scope of the invention.

Figure 2:
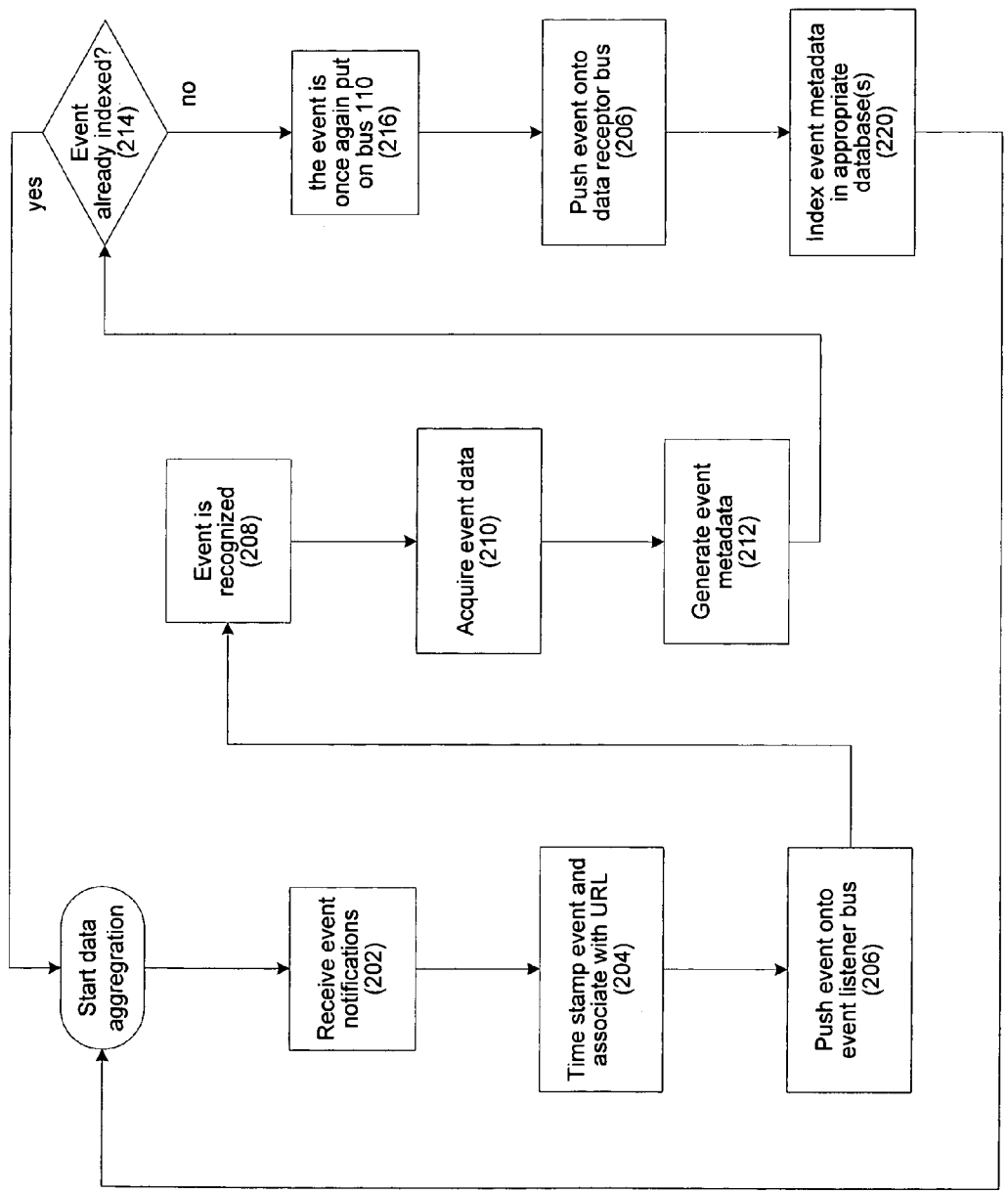
FIG. 2 is a flowchart illustrating a technique for aggregating data in a network environment according to a specific embodiment of the invention.

Referring now also to the flowchart of FIG. 2, one or more notification receptors 108, e.g., ping servers, act as event multiplexers taking all of the event notifications (202) coming in from a variety of different places and relating to a variety of different types of content and state changes. Each notification receptor 108 understands two very important things about these events, i.e., the time and origin. That is, notification receptor 108 time stamps every single event when it comes in and associates the time stamp with the URL from which the event originated (204). Notification receptor 108 then pushes the event onto a bus 110 on which there are a number of event listeners 112 (206).

Event listeners 112 look for different types of events, e.g., press releases, blog postings, job listings, arbitrary webpage updates, reviews, calendars, relationships, location information, etc. Some event listeners may include or be associated with spiders 114 which, in response to recognizing a particular type of event will crawl the associated URL to identify the state change which precipitated the notification. Another type of event listener might be a simple counter which counts the number of events received of all or particular types.

An event listener might include or be associated with a re-broadcast functionality which re-broadcasts each of the events it is designed to recognize to some number of peers, each of which may be designed to do the same. This, in effect, creates a federation of event listeners which may effect, for example, a load balancing scheme for a particular type of event.

Another type of event listener referred to herein as a "buzz" listener may be configured to listen for and track currently popular keywords (e.g., as determined from the content of blog postings) as an indication of topics about which people are currently talking. Yet another type of event listener looks at any text associated with an event and, using metrics like character type and frequency, identifies the language. With reference to the foregoing, it should be understood that event listeners may be configured to look for and track virtually any metric of interest.

Once an event is recognized (208) and the event data have been acquired (210) through some mechanism, e.g., a spider, the output of the event listeners is a set of metadata for each event (212) including, but not limited to, the URL (i.e., the permalink), the time stamp, the type of event, an event ID, content (where appropriate), and any other structured data or metadata associated with the event, e.g., tags, geographical information, people, events, etc. For example, the URL might indicate that the event occurred at the New York Times web site, the time stamp the time of the event, the type of event might indicate a blog post, the event ID a post ID, and the content would include the content of the blog post including any links. These metadata may be derived from the information available from the URL itself, or may be generated using some form of artificial intelligence such as, for example, the language determination algorithm mentioned above. In addition to spidering, event metadata may be generated by a variety of means including, for example, inferring known metadata locations, e.g., for feeds or profile pages.

The "crawlers" employed by specific embodiments of the present invention may not necessarily be crawlers in the conventional sense in that traditional crawlers are relatively autonomous and are not typically directed to a specific URL. By contrast, the crawlers employed by the present invention are directed to specific URLs or sets of URLs as listed, for example, in the sitemap or changes.xml file(s). These crawlers may employ parsers which are operable to break down the information being crawled and put the relevant portions, e.g., the posts, into the data model employed by the ecosystem database(s) (e.g., database(s) 106).

According to some embodiments, site 104 maintains information, e.g., hashes of previous posts, to ensure that only new information is indexed and scored. This, in turn, enables a very large version control system in which different parts of an HTML document can be "aged" differently. That is, the creation date of every separable part of an HTML document, including every link, can be tracked.

According to a specific embodiment, content may be classified based on links to an established topic directory or ontology, e.g., by looking at each piece of content and identifying outbound links and unusual phrases. An outbound link is then checked against an ontology (e.g., DMOZ (see http://dmoz.org/) or any other suitable ontology) and based on the link pattern, the content is automatically tagged as inside of that particular category. Then, a relevance weight may be assigned to the document with reference to the author's relative authority inside of that category (see below) as well as inbound links to that document inside of that category. This weight may further incorporate self-categorization, (e.g. "tags") of blogs and posts.

A number of databases 106 are maintained in which the event metadata are stored. According to a specific implementation, each event listener and/or associated spider is operable to check the metadata for an event against the database to determine whether the event metadata have already been stored. This avoids duplicate storage of events for which multiple notifications have been generated. A variety of heuristics may be employed to determine whether a new event has already been received and stored in the database. For example, as mentioned above, a hash of the metadata may be quickly compared to hashes of metadata for other events received for a particular URL. However, this may not be sufficient in that it may not be desirable to store all content changes.

An example of a blog post may be instructive. If the intent is to store only events corresponding to new posts in a blog, it is important to be able to determine whether a received event corresponds to a new post or to some extraneous information embedded in a web page, e.g., recent sporting event scores. Blog publishing tools commonly create a metadata feed (e.g., an RSS feed or Atom feed) alongside new html. A heuristic can refer to these feeds (e.g., using link tag alternates as a sitemap) to determine whether an event corresponds to a new post. This may be done, for example, with reference to the permalink(s) identified in this feed. Permalinks are the permanent links associated with content where that content may be found despite no longer being included at a particular URL, e.g., a new site's home page.

Once event metadata have been generated/retrieved (212) and it has been determined that the event has not already been stored in the database (214), the event is once again put on bus 110 (216). A variety of data receptors 116 (1-N) are deployed on the bus which are configured to filter and detect particular types of events (218), e.g., blog posts, and to facilitate storage of the metadata for each recognized event in one or more of the databases (220).

According to a specific implementation, each data receptor is configured to facilitate storage of events into a particular database. A first set of receptors 116-1 are configured to facilitate storage of events in what will be referred to herein as the Cosmos database (cosmos.db) 106-1 which includes metadata for all events recorded by the system "since the beginning of time." That is, cosmos.db is the system's data warehouse which represents the "truth" of the data universe associated with ecosystem 100. All other database in the ecosystem may be derived or repopulated from this data warehouse.

Another set of receptors 116-2 facilitates storage of events in a database which is ordered by time, i.e., the OBT.db 106-2. According to a specific embodiment, the information in this database is sequentially stored in fixed amounts on individual machines. That is, once the fixed amount (which roughly corresponds to a period of time, e.g., a day, or a fixed amount of storage, e.g., 4 GB RAM-based index) is stored in one machine, the data receptor(s) feeding OBT.db move on to the next machine. This allows efficient retrieval of information by date and time. For example, a user might want to know what people (or a particular person) were talking about on a particular date, or what the big events in the world were for a given time period.

Another set of data receptors 116-3 facilitates storage of event data in a database which is ordered by authority, i.e., the OBA.db 106-3. According to a specific embodiment, the information in this database is indexed by individuals and is ordered according to the authority or influence of each which may be determine, for example, by the number of people linking to each individual, e.g., linking to the individual's blog. As the number of links to individuals changes, the ordering within the OBA.db shifts accordingly. Such an approach allows OBA.db to be segmented across machines and database segments to effect the most efficient retrieval of the information. For example, the information corresponding to authoritative individuals may be stored in a small database segment with high speed access while the information for individuals to whom very few others link may be stored in a larger, much slower segment.

Authority may also be determined and indexed with respect to a particular category or subject about which an individual writes. For example, if an individual is identified as writing primarily about the U.S. electoral system, his authority can be determined not only with respect to how many others link to him, but by how many others identifying themselves as political commentators link to him. The authority levels of the linking individuals may also be used to refine the authority determination. According to some embodiments, the category or subject to which a particular individual's authority level relates is not necessarily limited to or determined by the category or subject explicitly identified by the individual. That is, for example, if someone identifies himself as a political blogger, but writes mainly about sports, he will be likely classified in sports. This may be determined with reference to the content of his posts, e.g., keywords and/or links (e.g., a link to ESPN.com).

Yet another set of data receptors 116-4 facilitate storage of event data in a database which is ordered by keyword, i.e., the OBK.db 106-4. These data receptors take the keywords in the event metadata for an incremental keyword index which is periodically (e.g., once a minute) constructed. According to a specific embodiment, these data receptors are based on Lucene (an open source Java tool kit for text indexing and searching) and have been tuned to enable high speed, near real-time indexing of the keywords. Most conventional keyword indexers can take days or weeks to create an index. That is, conventional keyword indexers create a data set, index the entire data set, and score the entire data set. By contrast, the keyword indexers employed by the present invention build the keyword index incrementally.

According to a specific embodiment, advantage is taken of the fact that keyword search may be made highly parallel. Very thin "slices" of new index information are "layered" on top of the existing index and incorporated into the main index over time. So, for example, every minute, the keyword data receptors add the information indexed in the preceding minute on top of the existing index. When some number of these one minute slices are accumulated, e.g., five, those slices are consolidated into a single five minute slice. This repeats until some number (e.g., four) of five minute slices are accumulated which are then consolidated into a single twenty minute slice. This consolidation into thicker and thicker slices continues until a slice is consolidated which is the size of the original underlying index, at which point, consolidation with the underlying index is effected. This approach allows structured queries for information literally within minutes or even seconds of the information being posted on the Web or Internet. It should be noted that the reference to keyword indexing in this paragraph is intended to be for exemplary purposes only and should not be construed as limiting the incremental indexing technique described. To the contrary, it should be understood that this technique may be used to incorporate new index information into any type of index.

Each of the main ecosystem databases (i.e., cosmos.db, OBT.db, OBA.db, and OBK.db) includes substantially overlapping sets of information. However, each differs from the others by how the information is indexed for response time.

When a new database is created which is to be ordered by some arbitrary index, e.g., mp3 title, new data receptors are configured to facilitate indexing of events in the new database which, as mentioned above may initially be constructed from the information in cosmos.db, i.e., information about mp3s going back "to the beginning of time." As will be understood, depending upon what is being indexed some databases will not include the entire universe of information represented in cosmos.db.

As database receptors generate new slices for particular databases, these slices are copied to a master database for each database (e.g., OBT.db, OBA.db, etc.) in the ecosystem. As will be discussed in greater detail below, there are also a number of slave database copies associated with each master database which are similarly updated and from which responses to search queries are serviced. That is, one or more query services 118 access the slaves for each database and have associated query interfaces 120 which look for and present queries appropriate to the particular database. According to specific embodiments, each slave maintains its entire copy of the database in system RAM so that the database in long term memory is, at least during run time, write only. This allows queries to be serviced much more quickly than if database reads had to access long term memory. Of course, it will be understood that this optimization is not necessary to implement the invention. For example, according to other embodiments, different segments of the master database may reside in different slaves. In one example, each slave in a cluster might store one week's worth of postings and articles from blogs and news sites. It will be understood that the manner in which data are stored or segmented across the slaves of a cluster may vary without departing from the invention.

Once the event metadata are indexed in the database, they are accessible to query services 118 which service queries by users 122. In contrast with the approach taken by the typical search engine, this process typically takes less than a minute. That is, within a minute of changes being posted on the Web, the changes are available via query services 118. Thus, embodiments of the present invention make it possible to track conversations on any subject substantially in real time.

According to some embodiments, caching subsystems 124 (which may be part of or associated with the query services) are provided between the query services and the database(s). The caching subsystems are stored in smaller, faster memory than the databases and allow the system to handle spikes in requests for particular information. Information may be stored in the caching subsystems according to any of a variety of well known techniques, but due to the real-time nature of the ecosystem, it is desirable to limit the time that any information is allowed to reside in the cache to a relatively short period of time, e.g., on the order of minutes. According to a specific implementation, the caching subsystem is based on the well known open source software Memcached. Information is inserted into the cache with an expiration time at which time, the information is deleted or marked as "dirty." If the cache fills up, it operates according to any of a variety of well known techniques, e.g., a "least recently used" (LRU) algorithm, to determine which information is to be deleted.

The ecosystem of the present invention represents a fundamental paradigm shift in the way in which data are aggregated and made searchable. Instead of the conventional paradigm of simply inserting data in one side of a database and then pulling it from the other, the universe of data on the Internet and the Web may be conceptualized and monitored as "streams" of information. Very simple, very fast applications (e.g., event listeners and data receptors) are constructed which do nothing but look for and capture specific streams of information which are then indexed, stored, and made searchable in near real time. And because these applications are all operating in parallel, the information for any given "stream" does not need to be first pulled out of some large data warehouse before it can be made available.

According to various embodiments, the event listeners and data receptors described above may be constructed from a variety of open source and proprietary software including, for example, Linux, Apache, MySQL, Python, Perl, PHP, Java, Lucene. According to a specific embodiment, the message bus is based on open source software known as Spread. Spread is a toolkit that provides a high performance messaging service that is resilient to faults across external or internal networks. Spread functions as a unified message bus for distributed applications, and provides highly tuned application-level multicast and group communication support.

According to various specific embodiments, access to the information accumulated by tracking site 104 may be provided in a variety of ways. A wide variety of mechanisms may be employed to enable users to get at information of interest indexed in the ecosystem. For example, conventional looking search interfaces may be employed which include text boxes in which users may enter keywords, phrases, URLs, etc. More advanced search tools may also be provided which, for example, enable the construction of Boolean expressions.

Regardless of the search interface employed, query services 118 corresponding to each of the databases in the ecosystem (e.g., cosmos.db, OBT.db, OBA.db, OBK.db, etc.) look at incoming search queries (via query interfaces 120) to determine type, e.g., a keyword vs. URL search, with reference to the syntax or semantics of the query, e.g., does the query text include spaces, dots (e.g., "dot" com), etc. According to embodiments employing a service oriented architecture (SOA), these query services are deployed in the architecture to statelessly handle queries substantially in real time.

When a query service recognizes a search query which corresponds to its database, it presents the query to one or more of the slaves for that database according to any suitable load balancing scheme and/or according to how the data are organized across the slaves. For example, using the example mentioned above in which each slave stores a particular week's worth of postings or articles, a query for the 20 most recent postings on a particular subject might result in a query service associated with OBT.db connecting with some number slaves associated with that database and corresponding to the most recent weeks. Similarly, a query for the 20 most authoritative blog posts referring to a particular New York Times article would result in a query service associated with OBA.db connecting with some number of slaves associated with that database. If the first slaves to which the query service connects can fully satisfy the query, no further slaves need to be consulted. On the other hand, the query service might need to connect with additional slaves if the requested number of results are not returned from the first set of slaves.

Keyword searching may be used to identify conversations relating to specific subjects or issues. "Cosmos" searching may enable identification of linking relationships. Using this capability, for example, a blogger could find out who is linking to his blog. This capability can be particularly powerful when one considers the aggregate nature of blogs.

That is, the collective community of bloggers is acting, essentially, as a very large collaborative filter on the world of information on the Web. The links they create are their votes on the relevance and/or importance of particular information. And the semi-structured nature of blogs enables a systematic approach to capturing and indexing relevant information. Providing systematic and timely access to relevant portions of the information which results from this collaborative process allows specific users to identify existing economies relating to the things in which they have an interest.

By being able to track links to particular content, embodiments of the invention enable access to two important kinds of statistical information. First, it is possible to identify the subjects about which a large number of people are having conversations. And the timeliness with which this information is acquired and indexed ensures that these conversations are reflective of the current state of the "market" or "economy" relating to those subjects. Second, it is possible to identify the content authors who may be considered authorities or influencers for particular subjects, i.e., by tracking the number of people linking to the content generated by those authors.

In addition, embodiments of the present invention are operable to track what subject matter specific individuals are either linking to or writing about over time. That is, a profile of the person who creates a set of documents may be generated over time and used as a representation of that person's preferences and interests. By indexing individuals according to these categories, it becomes possible to identify specific individuals as authorities or as influential with respect to specific subject matter. That is, for example, if a particular individual posts a significant amount of content relating to digital music players, that individual's level of authority (or influence) with regard to digital music players can be determined by identifying how many other individuals who are also interested in or authoritative with respect to digital music players (as tracked through their posts and links) link to the first individual. This enables the creation of a rich, detailed breakdown of the relative authority of each author across all topics in the ontology, based on the number of inbound links by other authors who create documents in that category.

And because the ecosystem "understands" when a piece of content, e.g., post, link, phrase, etc., was created, this information may be used as an additional input to any analysis of the data. For example, using time to enhance the understanding of influence of a document (or of an author who created the document) by looking at the patterns of inbound linking to a set of documents, you can quickly determine if someone is early to link to a document or late to link to a document. If a person consistently links early to interesting documents, then that person is most likely an expert in that field, or at least can speak authoritatively in that field.

Identifying and tracking authorities for particular subjects enables some capabilities not possible using conventional search engine methodologies. For example, the relevance of a new document indexed by a search engine is completely indeterminate because, by virtue of its being new, no one has yet linked to it. By contrast, because embodiments of the present invention track the influence of a particular author in a given subject matter area, new posts from that author can be immediately scored based on the author's influence. That is, using the newfound understanding of time and personality in document creation, we are able to immediately score new documents even though they are not yet linked widely because we know (a) what is in the new/updated document and can therefore use classification methods to determine its topic, and (b) the relative authority of the author in the topic area described. So, in contrast with traditional search engines, the present invention can provide virtually immediate access to the most relevant content.

In addition, the techniques of the present invention may be used to track the sub-topics within a particular subject matter area which are currently being discussed by the most influential authors in that area. For example, one might query the database regarding the topics currently being discussed by the 10 most influential authors in a particular subject matter area.

As mentioned above, tracking the posting of and linking to content by individuals (particularly authoritative individuals) over time essentially results in a collaborative filtering effect for any given subject or topic. Therefore, instead of relying on the editorial choices of the available news sources on the Web to inform one as to what is currently important, the collaborative filter enabled by the present invention may be used to provide vastly different perspectives on what is important and why.

For example, the present invention may be employed to track to what articles at the major news sites bloggers are currently linking. That is, the way in which the data acquired by the tracking site are organized allows not only searching by subject matter or author (i.e., "deep" searches), but by time (i.e., "wide" search). So, for example, all of the blog posts of the past 3 hours (or even within a rolling time window) may be evaluated to identify the most-linked-to news stories (and/or books, movies, etc.) about which some or all bloggers are posting content. This information may then be exposed on a Web page as the topics currently considered important by the blogging community. And given the global scope of the Web, the evolution of the topics of importance can be observed with the rotation of the globe through the use of a rolling window of time. The rolling time window could be extended arbitrarily, e.g., to 12 hours (or 24/48/72 hours, 7 days, etc.), to better identify and rank the specific news articles (and/or books, movies, etc.) to which some or all bloggers are linking.

According to various embodiments, a variety of services may be provided which are based on the data collected according to the invention. For example, a major news service could be provided with what a community of individuals linking to its site are currently saying about the news service and specific articles posted by the news service. In addition, information relating to other aspects of this "community of interest" may be provided to the news service. That is, given that the news service obviously has the attention of the individuals in this community, it could be relevant to identify what else this community might be talking about. In some sense, this could be like having a dedicated and nearly instantaneous focus group on the news service's editorial decisions. This information could be syndicated to the news service and used in any of a wide variety of ways including, for example, to generate story ideas (i.e., this is what our readers are interested in), hiring leads (i.e., many of our readers link to some columnist in Topeka, Kans.), or even be directly exposed on the Web in some way (i.e., here is what our community of readers is saying). It will be understood that a variety of sophisticated data analysis techniques may be employed to provide information of interest from such a data set.

As will be understood, such a community of interest can be identified for any Web site. In fact, different communities of interest for different Web sites, publications, subject matter areas, etc., can be identified and exposed (e.g., on a Web site) to enable users to consume what is being talked about regarding any specific publication or topic, e.g., sports news, technology news, right wing political news, left wing political news, etc.

So, through an understanding of time and individuals, embodiments of the present invention are able to discern categorization and authority, as well as authority within specific categories. And because data analysis of this information is able to "pivot" on a variety of metrics, both "deep" and "wide" searches may be effected to yield a variety of interesting information which is beyond the capabilities of traditional search technology.

Moreover, the ecosystem method of aggregation and search described herein may be applied in a wide variety of contexts. For example, an ecosystem may be implemented to track the way individuals sell things on the Internet. Thus, for example, if an individual posts an auction on an auction site, this event could trigger the generation of a ping or other notification mechanism which precipitates the transmission of a crawler which parses, indexes, and scores the newly posted auction in a manner similar to that described above. Another example is the release of a new book on a large retailer's site. In fact, any type of content published on the Web or Internet can be indexed and scored in this manner. Another example is the publication of press releases on the PR Newswire.

As will be understood, the timely capture of such publications enables a variety of additional services. For example, because a person having significant influence in the market for digital music players can be readily identified, such a person may wish to be an advertising affiliate and post notifications on his site of specific types of events (e.g., the publication of an auction for a digital music player) which are tailored specifically to his visitors. Such an individual might also want a "live" feed from publishers and sites which notifies him of publication events relating to his field of interest or expertise.

Similarly, instead of pushing company news to the PR Newswire, a company can post it to its own site and ping or send changes information to a tracking site which then acquires, indexes and scores the information for use in any of a variety of ways. For example, individuals can subscribe to filters which will cause them to be notified of such posts relating to specific topics.

In another example, when an employment related site posts a new resume, a tracking site can be notified, and the resume can be indexed and scored such that employers who have subscribed to appropriate filters can then be notified if the posted resume fits their criteria. To make the parsing of the resume information easier, the resume can have a standardized format and may, for example, comprise a templated XML document. This approach also allows the publisher of the content, e.g., the job applicant, to retain some amount of control over his data. That is, because the content, e.g., the resume, is typically published on the content creators' site, the content creator can continue to exercise editorial control, including taking the information down.

As should be apparent, the event-driven ecosystem of the present invention looks at the World Wide Web in a different way than conventional search technologies. That is, the approach to data aggregation and search described herein understands timeliness (e.g., two minutes old instead of two weeks old), time (i.e., when something is created), and people and conversations (i.e., instead of documents). Thus, the ecosystem of the present invention enables a variety of applications which have not been possible before. For example, the ecosystem of the present invention enables sophisticated social network analysis of dynamic content on the Web. The ecosystem can track not only what is being said, but who is saying it, and when. Using such an approach, it is possible to identify the first person who was first to articulate something on the Web. It is possible to analyze how ideas propagate on the Web; to determine who is influential, authoritative, or popular (e.g., by how many people link to this person). It is also possible to determine when people linked to a particular person. This kind of information may be used to enable many kinds of further analysis never before practicable.

For example, the blogosphere often "lights up" with respect to a particular topic (e.g., the President's National Guard scandal, rollout of the iPod mini at MacWorld Expo, etc.) in response to a recent article or news report. That is, many bloggers start "conversing" about the topic in response to the breaking of the news in the mainstream media. Not only does the present invention enable tracking of these conversations, it also enables the identification of individuals who were talking about the topic before release of the news. As will be understood, the ability to identify such "conversation starters" or influencers relating to particular topics is extremely valuable from a number of perspectives.

According to other embodiments, the ecosystem of the present invention can enable meaningful tracking of return on investment (ROI) for public relations. Conventional techniques for doing this are ineffective in that they don't typically provide much meaningful information. For example, one approach involves simply putting together a scrap book including any article in which a company was mentioned over some period of time, e.g., typically 30-90 days. Other than frequency, this information provides almost no other qualitative or quantitative information which may be readily used by the company to determine whether their PR dollars have been well spent. In fact, to date, there are virtually no consistent or reliable techniques for determining the effectiveness of PR dollars.

By contrast, the ecosystem of the present invention enables real-time tracking of conversations which are specifically about a particular marketing campaign including, for example, who is talking about the campaign and what they are actually saying about it. Thus, not only can a company identify the best way to create a "buzz" about their products, but it can also track the buzz, and, through timely access to dynamic content, tie it directly to PR dollars spent.

PR crises can also be tracked and managed using the ecosystem of the present invention. For example, if an event has occurred which is potentially damaging to a company's reputation, e.g., a news story about a defective product, the conversations about the event in which influential individuals are participating may be tracked for the purpose of devising an appropriate strategy for dealing with the crisis.

Media outlets (e.g., news organizations) can leverage the ecosystem architecture in a wide variety of ways. For example, the ecosystem may be used by a news site to understand how people are responding to its stories. That is, such outlets can incorporate event notification into their publishing systems so that each time an article is published, they ping the ecosystem to get indexed as described above. Then they can see who is talking about and linking to those stories and what they are saying.

Similarly, the operator of a news site can ask for the most popular stories published on its site in the past 12 hours, e.g., as indicated by the number of links to those stories. This "buzz" about a story can also be tracked over time, or compared to the buzz generated by a story about the same topic from a competitor's site. In addition, some measure of "scoop" protection may also be ensured in that the time of the ping (which corresponds to the original posting of a story) is stored in the database.

To add another layer, not only can the news site track the buzz, some of the tracked information can be embedded in the original story on the news site so that readers can see what others are saying about the story, e.g., a real-time "letters to the editor." More generally, representations of the near real time information available from the database (e.g., as embodied in graphs and charts or even raw data) can be presented live via a variety of media. For example, such information feeds could be provided in television programs in association with particular topics or as real time feedback for television programs (e.g., news, variety, talk shows, talent search, etc.).

Media outlets can also mine the ecosystem database to identify authoritative individuals who might be useful as sources for new articles, or might be attractive to recruit as new employees. More generally, because the database indexes information by authority, a search could be conducted for the most influential or authoritative people in any given subject matter area for any reason whatsoever.

It should be noted that database(s) 106 FIG. 1 may be configured in a variety of ways to suit particular implementations without departing from the scope of the invention. It will also be understood that maintaining one or more relational database in which large numbers of inserts, updates and deletes are being performed simultaneously with a large number of selects is a difficult problem, particularly as the size of the database increases.

Figure 3:
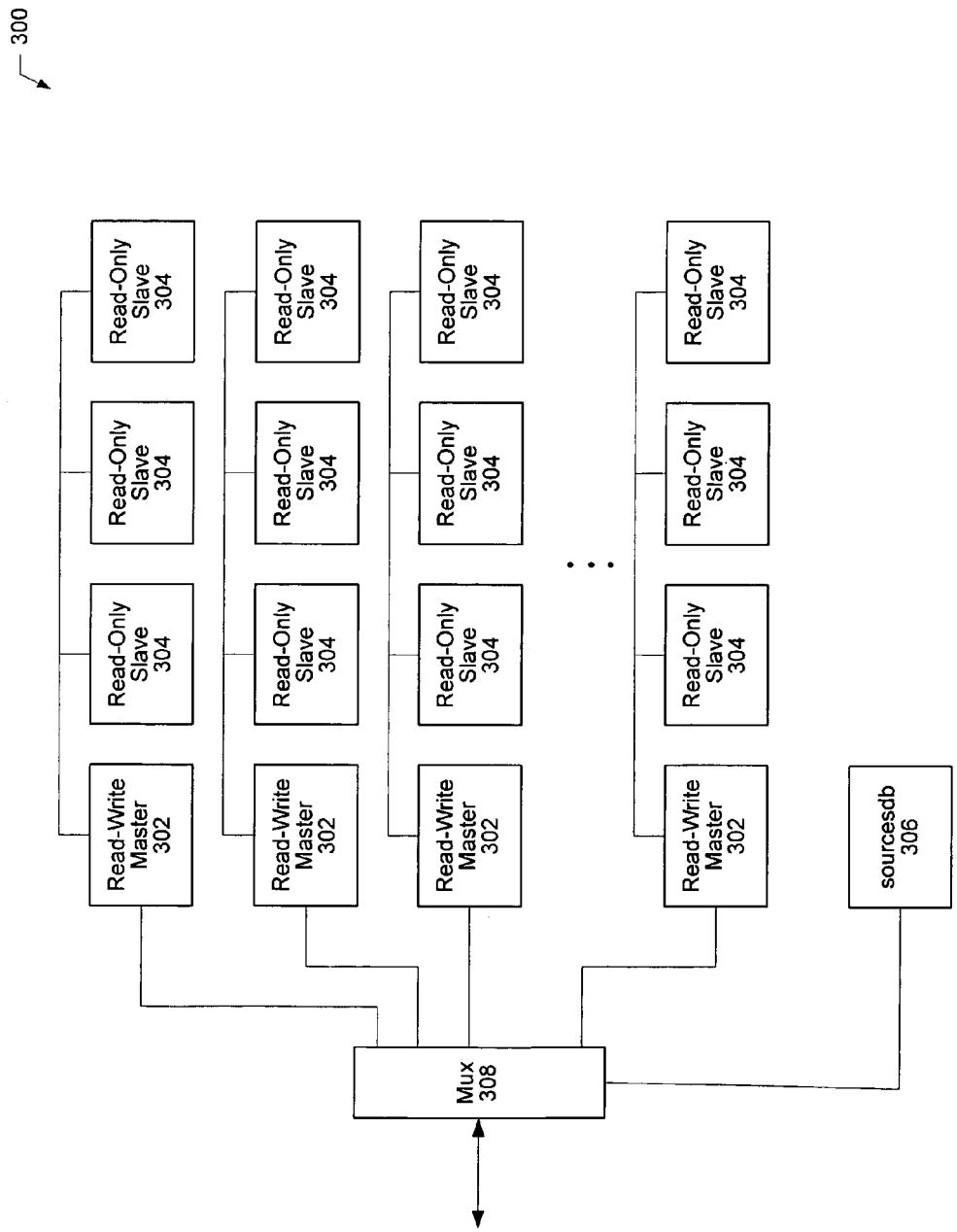
FIG. 3 is a simplified block diagram of a database architecture for use with various embodiments of the invention.

Therefore, according to a specific embodiment of the invention, a method is provided in which SQL databases are multiplexed to create a scalable, sharded, clustered database system 300 shown in FIG. 3. Individual SQL implementations running on networked hardware are linked and the database is fragmented onto individual clusters. Each fragment of the database runs on a single shard of the entire database. Each database shard is made up of a cluster of machines, one acting as the read-write master 302, and the other machines acting as read-only slaves 204 which contain copies of the master. Read requests can be distributed among an arbitrarily large number of slaves 204. Each shard is indexed on a single unique index, e.g., blog ID, and all information related to that index is stored on that shard. This approach allows all of the data to be maintained in RAM, resulting in suitably fast response times.

A separate database (the sourcesdb 206) is used to keep information on what shard contains information relating to that specific index. Each multiplexer (mux 208) contains a local in-memory copy of the database containing only the schemas and none of the data. This in-memory copy of the database is called the muxdb. Each mux connects to the databases on each shard and multiplexes queries out to one or more shards after parsing each incoming query and depending on the specific query (SELECT/INSERT/UPDATE/DELETE, etc) and whether the query is pivoting on the sharded index. For queries pivoting on the sharded index, the multiplexer talks only to the shard containing the data for the index in question. For queries that are not pivoting directly on the sharded index, the query is sent to all of the shards, and the responses are then collected by the mux in parallel and then a final collation of the data occurs when the a new table is created inside the muxdb using the original query as a table definition, and then the results of the parallel sharded queries are inserted and the original query is run on the new, much smaller, in-memory table.

The muxes can be parallelized as well, creating a large redundant system. In addition, if a query times out, the mux marks the shard where the query was sent so that the bad database inside of the cluster can be removed or repaired. Lastly, new shards can be added to the system as the size of the clustered index grows, and more slaves can be added to each shard as the number of read queries to the overall system grows. This allows the delivery of real-time results even as load on the overall system grows, and increased I/O throughput to the entire system even as the amount of data in the system grows.

According to one implementation, a computersdB is maintained which maintains a list of computers in the grid, their roles, shard IDs, and statuses (online, offline, busy, repair, etc.). The muxes use this information for failover and to dynamically grow/shrink the grid reliably.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method of data aggregation in a network, comprising:

receiving event notifications from a plurality of content sites on the network, each event notification indicating occurrence of an event associated with a corresponding one of the content sites, each event corresponding to a change to content associated with the corresponding content site;

in response to each event notification, generating event metadata, the event metadata including a time stamp corresponding to the event and change data corresponding to the change to the content; and indexing the event metadata for each event in each of a plurality of different databases with reference to a plurality of index metrics including the time stamp, the event metadata being ordered in each of the different databases according to a different one of the index metrics, the indexing of the event metadata corresponding to each event occurring within seven days of receipt of the corresponding event notification to enable retrieving of the changes to the content from the plurality of databases using any of the index metrics;

wherein the event metadata corresponding to first selected ones of the events include inbound link data relating to links pointing to the content associated with the first selected events, and wherein the event metadata corresponding to second selected ones of the events include keyword data relating to keywords identified in the content associated with the second selected events, and wherein the plurality of databases comprises a global database in which the event metadata corresponding to all events are indexed, an ordered-by-time database in which the event metadata corresponding to all events are primarily indexed with reference to the time stamp, an ordered-by-authority database in which the event metadata corresponding to the first selected events are primarily indexed with reference to the inbound link data, and an ordered-by-keyword database in which the event metadata corresponding to the second selected events are primarily indexed with reference to the keyword data.

2. The method of claim 1 wherein the event notifications are generated by event notification code associated with content publishing code.

3. The method of claim 2 wherein the content publishing and event notification codes both reside on selected ones of the content sites.

4. The method of claim 3 wherein the event notification code is integrated with the content publishing code on at least some of the selected content sites.

5. The method of claim 2 wherein at least a portion of the content publishing and event notification codes resides on a third party service provider network separate from and associated with selected ones of the content sites.

6. The method of claim 2 wherein the content publishing code comprises any of a web log publishing tool, a wiki web page editing tool, a social network profile editing tool, a content management system tool, and a personal publishing tool.

7. The method of claim 1 further comprising receiving and indexing aggregated change data from a third party service provider site, the aggregated change data corresponding additional changes to content corresponding to additional content sites associated with the third party service provider site over a period of time.

8. The method of claim 1 further comprising, in response to selected ones of the event notifications, retrieving at least a portion of the event metadata from the corresponding content sites.

9. The method of claim 8 further wherein retrieving at least a portion of the event metadata comprises any of spidering the corresponding site, inferring known metadata locations corresponding to feeds, and inferring known metadata locations corresponding to profile pages.

10. The method of claim 1 the event metadata corresponding to selected ones of the event notifications is determined at least in part with reference to the selected event notifications.

11. The method of claim 1 wherein the event metadata corresponding to each event further relates to any of a uniform resource locator (URL) associated with the content site corresponding to the event, a permalinik associated with the change in content, a content creator identifier, an event type identifier, an event identifier, the content, the change to the content, at least one keyword relating to the content, inbound links to the content, outbound links from the content, and any structured data or metadata associated with the event.

12. The method of claim 1 wherein the change data corresponding to selected events include new content posted on the corresponding content sites.

13. The method of claim 1 wherein each of the plurality of databases has an associated index, and wherein indexing the event metadata in each of the plurality of databases comprises:
    indexing recently received event metadata into a first plurality of incremental indexes corresponding to a smaller one of a plurality of incremental index sizes;
    combining the first plurality of the incremental indexes to create one of a second plurality of incremental indexes corresponding to a larger one of the plurality of incremental index sizes; and
    repeating the indexing and combining to incrementally integrate all of the event metadata into the index.

14. The method of claim 1 further comprising retrieving portions of the event metadata from the plurality of databases in response to queries.

15. The method of claim 14 wherein each of the plurality of databases comprises a master copy of the database and a plurality of slave copies of the database, and wherein retrieving portions of the event metadata in response to the queries comprises retrieving the event metadata from the slave copies.

16. The method of claim 1 further comprising identifying authoritative individuals corresponding to each of a plurality of categories with reference to the ordered-by-authority database.

17. The method of claim 16 wherein identifying the authoritative individuals corresponding to each category comprises identifying specific content in the category generated by the authoritative individuals with reference to a number of inbound links associated with the specific content.

18. The method of claim 17 wherein identifying the authoritative individuals corresponding to each category further comprises weighting the number of inbound links with reference to an authority metric associated with related content from which the inbound links originated.

19. The method of claim 16 wherein identifying the authoritative individuals corresponding to each category comprises identifying first specific content in the category directed to which second specific content associated with the authoritative individuals includes outbound links.

20. The method of claim 19 wherein identifying the authoritative individuals is done with reference to the time stamps associated with the second specific content.

21. The method of claim 1 further comprising tracking responses of a plurality of individuals to a specific event with reference to the plurality of databases.

22. The method of claim 21 wherein tracking of the responses is done with reference to responsive content generated by the individuals and indexed in the plurality of databases.

23. The method of claim 21 further comprising generating representations of the responses which are operable to be presented as feeds in live media.

24. The method of claim 23 wherein the representations are operable to represent changes in the responses over time.

25. The method of claim 1 wherein the indexing of the event metadata corresponding to each event occurs within one of one day, 12 hours, six hours, three hours, two hours, one hour, 10 minutes, and 2 minutes.

* * * * *

UNITED STATES PATENT AND TRADEMARK OFFICE
CERTIFICATE OF CORRECTION

PATENT NO. : 7,596,571 B2  Page 1 of 1
APPLICATION NO. : 11/157491
DATED : September 29, 2009
INVENTOR(S) : David L. Sifry It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 419 days.

Signed and Sealed this

Twenty-eighth Day of September, 2010

David J. Kappos
*Director of the United States Patent and Trademark Office*